Aug. 3, 1965 H. LINDNER ETAL 3,198,374
LEAKPROOF BOTTLED LIQUID MAILABLE CONTAINER
Filed Aug. 31, 1962
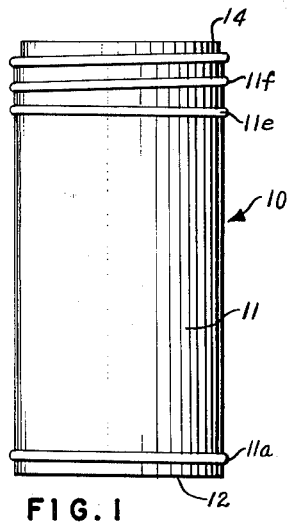
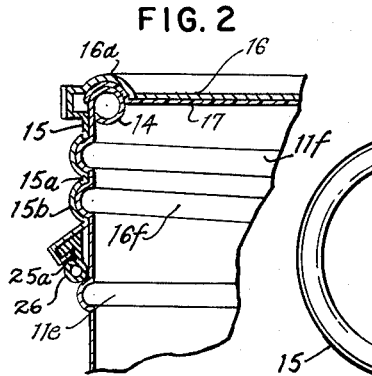
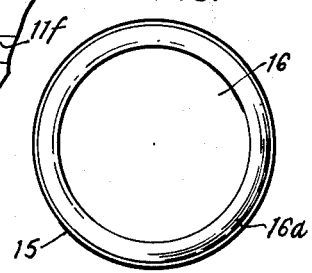
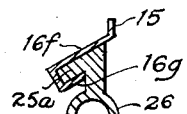
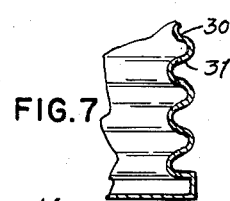
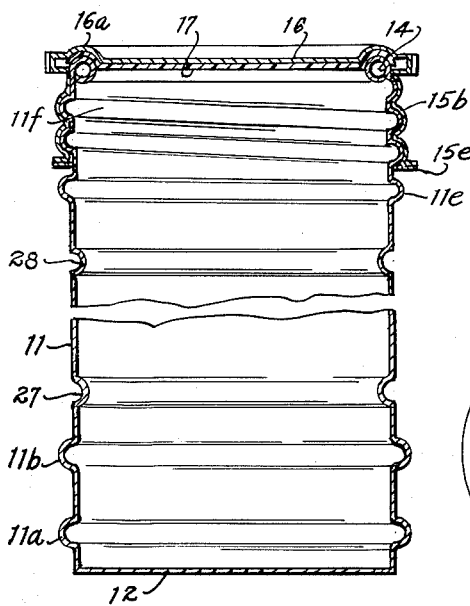
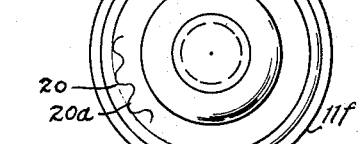
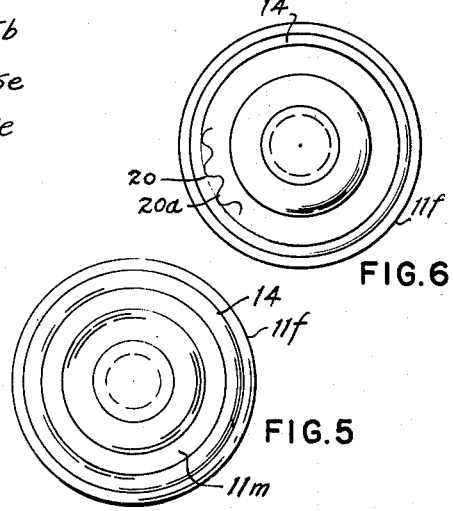
INVENTORS.

United States Patent Office 3,198,374
Patented Aug. 3, 1965

3,198,374
LEAKPROOF BOTTLED LIQUID MAILABLE CONTAINER
Harold Lindner and Alfred Lindner, both of 58 Warren St., New York, N.Y.
Filed Aug. 31, 1962, Ser. No. 220,811
6 Claims. (Cl. 220—39)

This invention relates to a mailable container unit, in which medical specimens and specimen liquids are mailed in a glass vial or bottle disposed in the container, and one of the objects of the invention is to provide a container body which is seamless and which is formed with a curled upper end, disposed in true concentric relation to the cylindrical body of the container and disposed in a plane in true right angular relation to the major axis of the container body, and provided with a rolled screw thread and a seamless cap having a mating screw thread, which is also formed with a concentric groove and provided with a gasket of yielding material which engages the wall of this groove, and which is adapted to be manually coupled on the container body by turning the screw threaded cap, so that the rolled upper end of the container body will have a leakless sealing engagement with the gasket and the groove of the closure cap, and equal pressure will be applied on the inset curled edge of the container body and the wall of the closure cap groove, so that true concentric sealing will result in a leakless joint.

Another object of the invention is the provision of a seamless container body with stiffening beads designed to prevent crushing and body distortion, and to provide an auxiliary seal between the closure cover and the upper bead of the container body, which materially increases the protection provided against external discharge of any liquid contents, so the mails are effectively protected, a wrapper or enclosure of absorbent cotton being provided to absorb any leakage arising from breakage of the enclosed bottle, and to absorb shocks of handling.

With the above and other objects in view the invention comprises certain new and useful constructions, combinations and arrangements of parts, fully shown in the accompanying drawings and clearly described in the following specification thereof, and in the drawings:

FIG. 1 is a side elevation of the seamless container body, showing the cover removed.

FIG. 2 is an enlarged detail sectional view, showing the cover in place, and also showing an auxiliary sealing gasket on the rim of the cover.

FIG. 3 is an enlarged sectional view of the cover and the container, broken away, showing the cover without the auxiliary sealing gasket.

FIG. 4 is a top plan view of the cover.

FIG. 5 is a top plan view of the container, showing a bottle disposed therein and a jacket of absorbent material enclosing the bottle.

FIG. 6 is a similar view, showing the use of a corrugated ring between the bottle and the wall of the container.

FIG. 7 is a detail sectional view of a corrugated container wall.

FIG. 8 is an enlarged detail sectional view of the auxiliary sealing gasket and its connection with the rim flange of the closure cap.

Referring to the accompanying drawings, 10 designates a metal container, preferably made from aluminum or similar material, which can be extruded, and which includes the cylindrical wall 11 and the bottom wall 12, made integral with each other by an extrusion impact or extrusion by any other means, or by drawing, to provide a body wall which is a true circle and an end wall joined thereto without a connecting seam, and thus providing a jointless and seamless container, having its body and end walls of high density metal.

To stiffen this truly circular body wall 11 against distortion in movement with the mails, it is formed with external or circumscribing beads 11a and 11b, spaced apart from each other, and located near the bottom wall 12; another similar pair of external beads 11c and 11d, located near the middle section of the wall, and a single external bead 11e, located immediately below the rolled or molded screw threads 11e of the container wall, but slightly spaced therefrom.

The upper end edge of the container wall 11 is curled inwardly upon itself, to provide a tubular end sealing surface 14, which is slightly inset from the plane of the outer surface of the body wall, and which is truly circular in cross section, due to the tubular construction of the sealing end. The body wall 11 previous to this curling is trimmed to provide an end edge which is in true right angular relation to the major axis of the container wall, and this cut edge is curled so that it has pressure contacting engagement with the contiguous portion of the container wall 11, and will thus offer maximum resistance against distortion when end sealing pressure is developed upon it.

It is well known that containers now in use for mailing service for these general uses, are constructed from flat sheet steel tinned in the mill. Blank pieces the size required for the cylindrical wall of the container, are cut and formed into a cylindrical shape by hand, so the longitudinal edges of the formed cylinder will overlap on each other, and while this cylinder is hand held it is soldered so that this overlapping joint becomes permanent. By this method of forming the cylindrical body wall a non-circular wall is produced, due to these overlapping longitudinal edges. To this non-circular wall a bottom wall is soldered. The open end of the can is then formed with an inset horizontal flange. Due to the fact that the body wall is not formed in a true circle, the upper end, which becomes the sealing end of the can is distorted from a true circle. This distortion is increased when the thin, unreinforced, horizontal flange of the upper or open end of the can or container is bent from its original condition.

Due to these distortions perfect sealing of this type of mailable container is difficult if not impossible in most cases. With this type of container additional distortions develop because of rough handling in transit through the postal system, and as these containers are used for the transport of medical specimens, many of which may contain dangerous germs, and in most cases do contain spillable liquids, the need has developed for a container having a true circular body and a dependable true circular end sealing, and a body made without seams, or completely jointless, from non-corrosive material, which cannot rust.

The commonly used mailable container for liquids and medical specimens, presents a sharp or raw steel edge to a hand inserted in the container to withdraw a bottled specimen, and if this hand is scratched or cut by this raw steel edge, and any of the medical specimen should be spilled or leak out of the container, in which the specimen is held, then a dangerous infection can result.

The upper curled edge of our improved mailable container has a truly circular curled edge, which offers very great resistance to distortion, and which presents a truly level top surface for engagement by the gasket of the closure cap, so that perfect sealing can result. This curled circular edge is slightly inset so that it can have effective pressure engagement with the groove of the closure cap, and the central portion of the end wall of the closure cap is depressed, so that opening up of the sealing groove of the closure cap is effectively prevented, and the original die shaped condition of this cap will continue for the life of the container. The forming of this curled sealing edge may be done after the body of the can has been extruded or drawn, and its edge trimmed in a true right angular relation of the major axis of the container. In making this curl the die slightly insets the curled edge, as shown in FIG. 1. The closure cap is formed with an external bead 16b, immediately below the convex-concave sealing portion 16a, which provides limited spring action or resiliency for the sealing portion 16a, and insures, when the cap is threaded tight a constant spring pressure on the gasket under the portion 16a.

The closure cap is constructed with a marginal inclined flange 16f, which is folded upon itself to retain the marginal edge flange 25a of the rubber or resilient sealing ring 25, which includes a hollow circular ring 26, formed integral with said flange 25a, which is approximately V-shape. When the closure cap is threaded on the container, the gasket of the closure cap is first forced into pressure contact with the curled sealing edge 14, but while this is being done the hollow gasket ring 26 is being forced into pressure contact with upper external bead of the container wall at 11e, and this pressure contact thus provides an auxiliary seal for the closure cap.

The container body wall is also formed with a plurality of internal beads 27 and 27a, which establish an inner diameter, within each internal bead, similar to that of the curled sealing edge 14. The result is that any bottle or inner container disposed in the main body wall will be equally spaced from this body wall, and less distortion will result.

The mating screw threads are so formed that even pressure is developed on the curled sealing edge, and on the upper external bead.

Due to the fact that the marginal edge portion of the gasket of the closure cap is confined under pressure in the marginal edge groove of the closure cap, less distortion of the gasket takes place, than under other conditions of sealing.

In FIG. 7 we show a portion of the main wall of the container which is formed with alternating external and internal beads 30 and 31, giving the container wall a corrugated wall condition.

Having described our invention, we claim as patentable:

1. In combination, a mailable leakproof container having a cylindrical wall and a bottom wall formed without joining seams and provided with a coupling thread on the upper end portion of the body wall, the upper end edge of the body wall being curled inwardly into pressure contact with the body wall to provide a true circular inwardly rolled edge disposed in a true right angle relation to the major axis of the container, and a closure cap having a skirt formed with a mating coupling thread threaded thereby on the container, the closure cap having an end wall integral with the skirt thereof and said end wall having a circular groove near its outer edge portions and a sealing gasket engaged with the inner surface of said wall and said groove and said rolled edge being forced against said sealing gasket into said groove when the closure cap is threaded on said container, whereby a leakless sealing engagement is established between said closure cap and said container, the cylindrical wall having internal beads spaced longitudinally thereon and having approximately the same internal diameter as the internal diameter of the curled edge of the body to provide a bore diameter of approximately uniform diameter from end to end through which a bottle may freely slide into and out of the container wall.

2. The construction set forth in claim 1, the cylindrical wall of the container being formed with a plurality of external beads stiffening said wall against collapsing pressures applied external thereto, and said beads being spaced apart longitudinally from each other to equalize the external diameter of the container and to equalize any external pressure applied thereon.

3. A mailable container, comprising a cylindrical body having an integral end wall devoid of seams, the cylindrical wall being formed with rolled screw threads and an inset upper edge portion having a closed curled sealing ring of tubular shape providing a continuous sealing edge disposed in true right angular relation to the longitudinal axis of the cylindrical wall, a closure cap having an end wall and a pendant skirt wall of seamless construction and a rolled screw thread on said skirt wall having a mating fit with the rolled screw threads of the cylindrical wall, the end wall of the closure cap having sealing means to engage said curled edge, the cylindrical wall having a bead below said screw threads, and the skirt wall of the closure cap having a gasket ring secured thereto which is adapted to have pressure sealing engagement with the bead when said closure cap is tightened on said screw threads of the cylindrical wall.

4. The construction set forth in claim 3, said gasket being of tubular construction and said skirt wall having a flange coupled to said gasket and adapted to transmit pressure to said gasket when the closure cap is threaded on the cylindrical wall.

5. A mailable liquid holding container, comprising an extruded container formed without joints and provided with a cylindrical wall and a circular end wall integral therewith, the upper end of the cylindrical wall being formed with an internal curled edge circular in cross section providing a convex sealing end surface and further formed with a plurality of external beads spaced apart from each other and a plurality of internal beads spaced apart from each other and providing internal bead diameters approximately that of the curled edge to permit a liquid holding vessel to slide freely into and out of the cylindrical wall, the upper end of the cylindrical wall being formed with external screw threads, and a closure cover having a cylindrical wall and an end wall integral therewith, the cylindrical wall of the cover having screw threads to have a coupling action on the screw threads of the cylindrical wall, the end wall of the cover having a annular groove disposed in concentric relation to the curled edge of the container wall and provided with a sealing gasket, the end wall of the cover being inset, and the cover having an external bead adjacent but inwardly to the annular groove thereof adapted to impart a spring action to said annular groove on said curled edge to maintain spring pressure on said curled edge.

6. A container for mailing liquids and medical specimens comprising an extruded container shell having a cylindrical wall and an integral end wall, the cylindrical wall having an inwardly curved circular edge portion disposed in pressure engagement with the cylindrical wall, the cylindrical wall being formed with rolled screw threads on the upper end portion thereof and provided with external stiffening beads spaced apart and internal stiffening and spacing beads spaced apart, and a closure cover extruded to provide a cylindrical wall and an integral end wall, the major central portion of the end wall being depressed and the outer marginal portion of said end wall having a circular grooved portion presenting a convex sealing surface, the cylindrical wall of the cover having mating rolled screw threads to engage the threads of the container shell, said cover cylindrical wall being formed with an inclined flange on its lower edge portion and provided with a hollow gasket ring clamped thereto and an external bead on said container wall with which said gasket ring has pressure engagement when said closure cover is tightly threaded on said container cylindrical wall, the internal beads of said container cylindrical wall having the same internal diameter as the curled edge of said wall, whereby a liquid holding container may be inserted in said cylindrical container wall and withdraw by freely sliding action therewith.

References Cited by the Examiner

UNITED STATES PATENTS

| | | | |
|---|---|---|---|
| 1,173,833 | 2/16 | Merwin | 215—12 |
| 1,489,950 | 4/24 | Kronquest | 220—72 |
| 2,298,293 | 10/42 | Hothersall | 220—39 |
| 2,304,896 | 12/42 | Doyle | 220—39 |

FOREIGN PATENTS 1,265,395   5/61   France.

THERON E. CONDON, *Primary Examiner.*

EARLE J. DRUMMOND, GEORGE O. RALSTON,
*Examiners.*